June 4, 1963

U. GERMEN 3,092,254

CONTROL APPARATUS

Filed May 1, 1961

INVENTOR.
USTUN GERMEN
BY
ATTORNEY

June 4, 1963 U. GERMEN 3,092,254
CONTROL APPARATUS
Filed May 1, 1961 6 Sheets-Sheet 3

INVENTOR.
USTUN GERMEN
BY
ATTORNEY

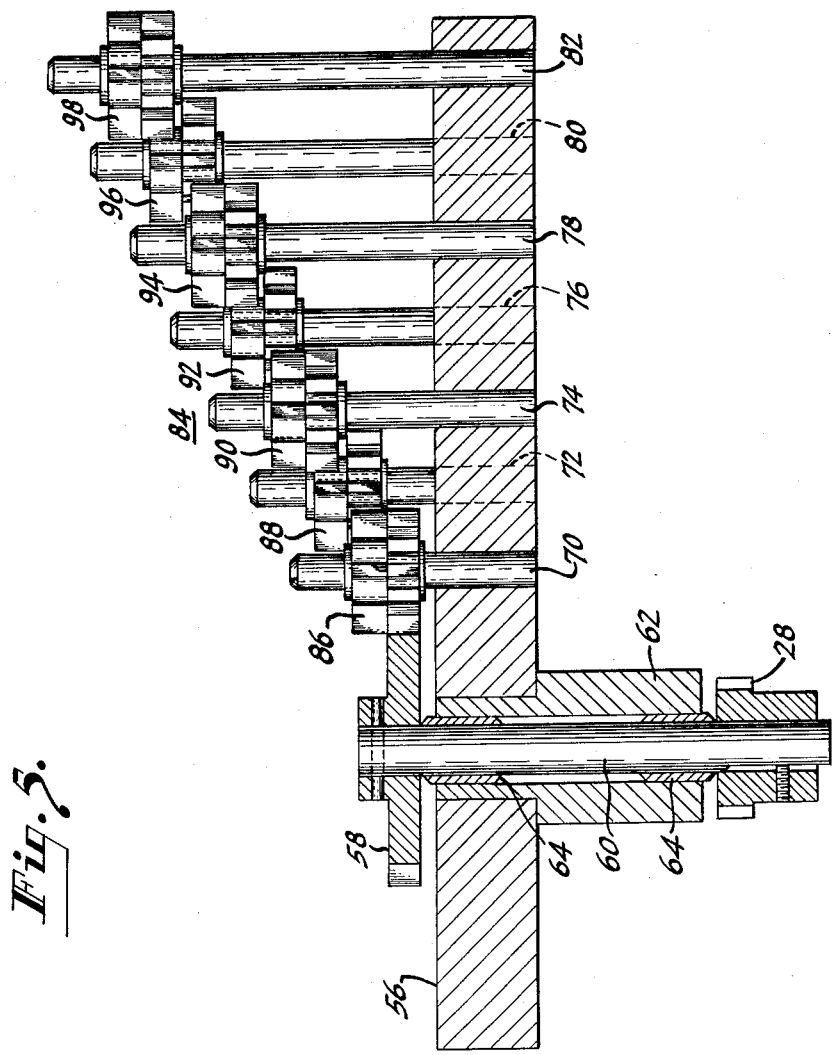

INVENTOR.
USTUN GERMEN

INVENTOR.
USTUN GERMEN
BY Morris Rabkin
ATTORNEY

United States Patent Office 3,092,254
Patented June 4, 1963

3,092,254
CONTROL APPARATUS
Ustun Germen, Camden, N.J., assignor to Radio Corporation of America, a corporation of Delaware
Filed May 1, 1961, Ser. No. 116,219
19 Claims. (Cl. 211—1.5)

The present invention relates to control apparatus, and more particularly to an improved system, which is adapted for digital control, for positioning an object in a selected one of a plurality of discrete positions.

The invention is especially suitable for use in a random access information storage device. Such devices are usually referred to as random access memories and may form a part of an electronic digital computer system.

The invention is adaptable to the type of random access memory having a plurality of records in each of which different data may be stored. It is desirable to have access to any of the records which might be selected at random in response to appropriate command signals. The locations of the records are called addresses. In computer systems, time is of the essence. Thus, it is important to quickly make available a record, at any desired address, for use by the computer.

Magnetic record members, such as discs, cards, and the like, are often used in random access memories. Magnetic transducers conventionally known as magnetic heads must be brought into transducing relationship with the record of a desired address in order to record (write) data on or reproduce (read) data from the record. To this end, the heads must usually be placed in intimate contact with the desired record. This involves movement of the record, the heads, or both to bring the record corresponding to the desired address and the heads into contact with each other.

The problem of providing random access to any of a plurality of records presents many difficulties, particularly when a large number of records is required. It has been suggested to provide heads individual to each record and to use electrical selection matrices to provide selection of the heads for the record at a desired address. Such a system is very expensive when a large number of addresses is required since a multiplicity of relatively expensive magnetic heads is needed.

Systems have been provided which move either an array of records or a magnetic head and which automatically bring the record at a randomly selected address and the head into contact with each other. Known systems have not, however, been entirely satisfactory. They have either involved servomechanisms of considerable complexity, or have been slow acting. For example, systems of the latter type are either restricted to a slow speed of movement so as to minimize hunting, or they are incapable of selecting the shortest path of movement to reach a record at a selected address.

Accordingly, it is an object of the present invention to provide an improved control apparatus which operates rapidly to position an object at a selected one of a plurality of discrete positions in a minimum of time irrespective of the initial position of the object.

It is a further object of the invention to provide an improved discrete position servo system which is adapted for digital control.

It is a still further object of the present invention to provide an improved control system for a random access data storage device which facilitates rapid random access to information stored in the device and which is low in cost.

It is a still further object of the present invention to provide an improved servo system which is operative to rapidly position a movable member, such as one which is rotatable into a desired, discrete angular position, and which is less complex and lower in cost than other servo systems capable of the similar speeds of operation.

It is a still further object of the present invention to provide an improved servo system for so controlling the movement of a rotatable object that it rotates through the shortest possible path to reach a selected position.

Briefly described, the invention may be applied to control the movement of an object among positions arranged along a closed path with respect to which a plurality of numbers are assigned. The numbers are ordered consecutively with respect to a reference position and each number corresponds to a different object position. The numbers of the initial and the desired positions of the object are compared to derive the sense of the difference between these respective position numbers. The direction of movement of the object is dictated by the results of the comparison. The results of the comparison are modified when the shortest path between the initial and desired positions is through the transition between the numbered positions of highest numerical value and lowest numerical value. This transition may correspond to the reference position. Accordingly, the object will always move through the shortest possible path.

Further in accordance with the invention, the number of the desired position of the object may be increased or decreased depending upon the desired direction of movement of the object to provide a modified number representing an apparent position of the object closer to the ultimate or index position which the object is to assume. A comparison is then made between this modified number and the number of the initial position of the object. The results of (a) the last mentioned comparison and (b) the comparison of the number of the initial position of the object and the unmodified number of the desired position thereof are compared. If both results of comparison a and comparison b are the same, the object is initially moved at high speed toward the desired position; otherwise, the object is moved at slow speed toward the desired position. Thus, the object will move from its initial to its desired position at an improved speed of response and along the shortest path.

In a random access memory in accordance with the invention, an array of records is provided. Each record is at a discrete position. These discrete positions are numbered consecutively from a reference position and are disposed around a closed path. Drive means are provided to move the array of records as a whole so as to position any selected record at an index point or station at which the transducing operation takes place. A head for reading from or writing on the selected record may be located at a station near the index point. However, the head may alternatively be moved to the selected record in accordance with the invention. Control means for the drive means are provided which includes a comparator for comparing a binary number which is the address of the selected record unit with a binary number which is the address of the record which is initially at the index point. The comparator includes means for making the comparison in parts. The highest order digits of the binary numbers corresponding to the address of the selected record and the address of the record initially at the index point are compared to determine if the shortest path will be through the reference position. The lower order digits of the binary numbers are separately compared to determine the sense of the difference therebetween. The prime mover is conditioned in response to the results of both comparisons to drive the array of records in one of two opposite directions to move the selected record through the shortest possible path to the index point position.

In accordance with the speed control feature of the invention, as applied to a random access memory, switch means are provided for adding or subtracting, based upon the direction of travel dictated by the comparison set forth above, a number corresponding to a predetermined number of positions from the selected record. The address of the selected record is modified to represent the address of a record closer, by the predetermined number of positions to the index point. The prime mover is conditioned by the comparator to run at high speed until the record at the modified address passes the index point. The selected record is reached by moving the prime mover at much slower speed. In this way, much of the hunting required to reach a desired position is eliminated and the time for access to a record unit is decreased.

The invention itself, both as to its organization and method of operation, as well as additional objects and advantages thereof, will become more readily apparent from a reading of the following descripton in connection with the accompanying drawings, in which:

FIGURE 5 is a sectional view of the position coder taken along the lines 5—5 of FIG. 4 and viewed in the direction of the appended arrows.

General

Figure 1:
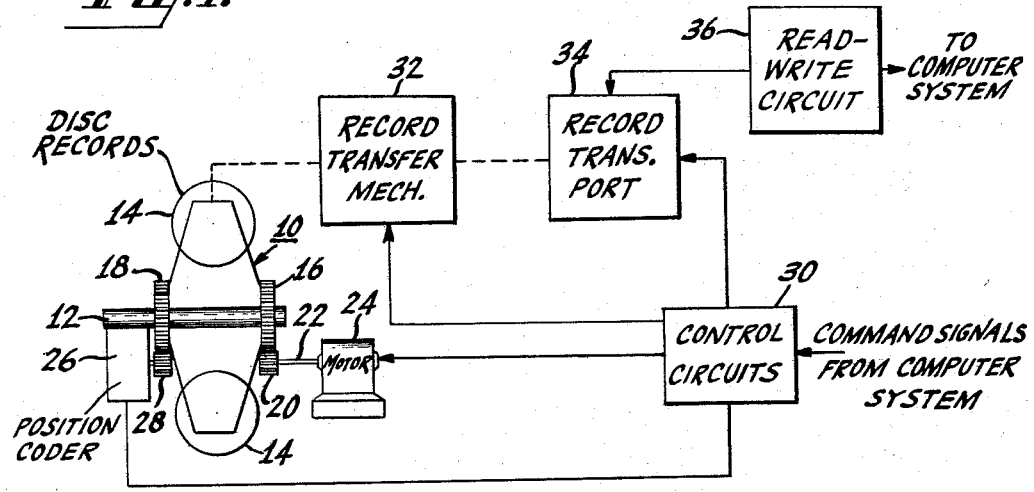
FIGURE 1 is a diagrammatic view, partially in block form, of a random access memory incorporating the invention.

Referring, now, more particularly to FIG. 1, there is shown a random access memory which is adapted for digital control in accordance with a binary code. Binary coded command signals are applied to the memory from some user apparatus, such as a digital computer system. The random access memory includes a rotatable record support or basket 10. This support is rotatable about a fixed shaft 12 upon which it is mounted. The basket 10 carries a plurality of records 14 in individual compartments which extend radially with respect to the shaft 12. The records 14 are magnetic disc records having coatings of magnetizable material on the opposite sides thereof.

Gears 16 and 18, which are rotatable about the shaft 12, are secured to the basket for rotation therewith. A spur gear 20 secured to a drive shaft 22 of an electric motor 24 drives the gear 16 and thereby rotates the basket about the shaft 12. Because of this gearing, the motor shaft 22 and the basket 10 rotate in opposite directions.

Figure 4:
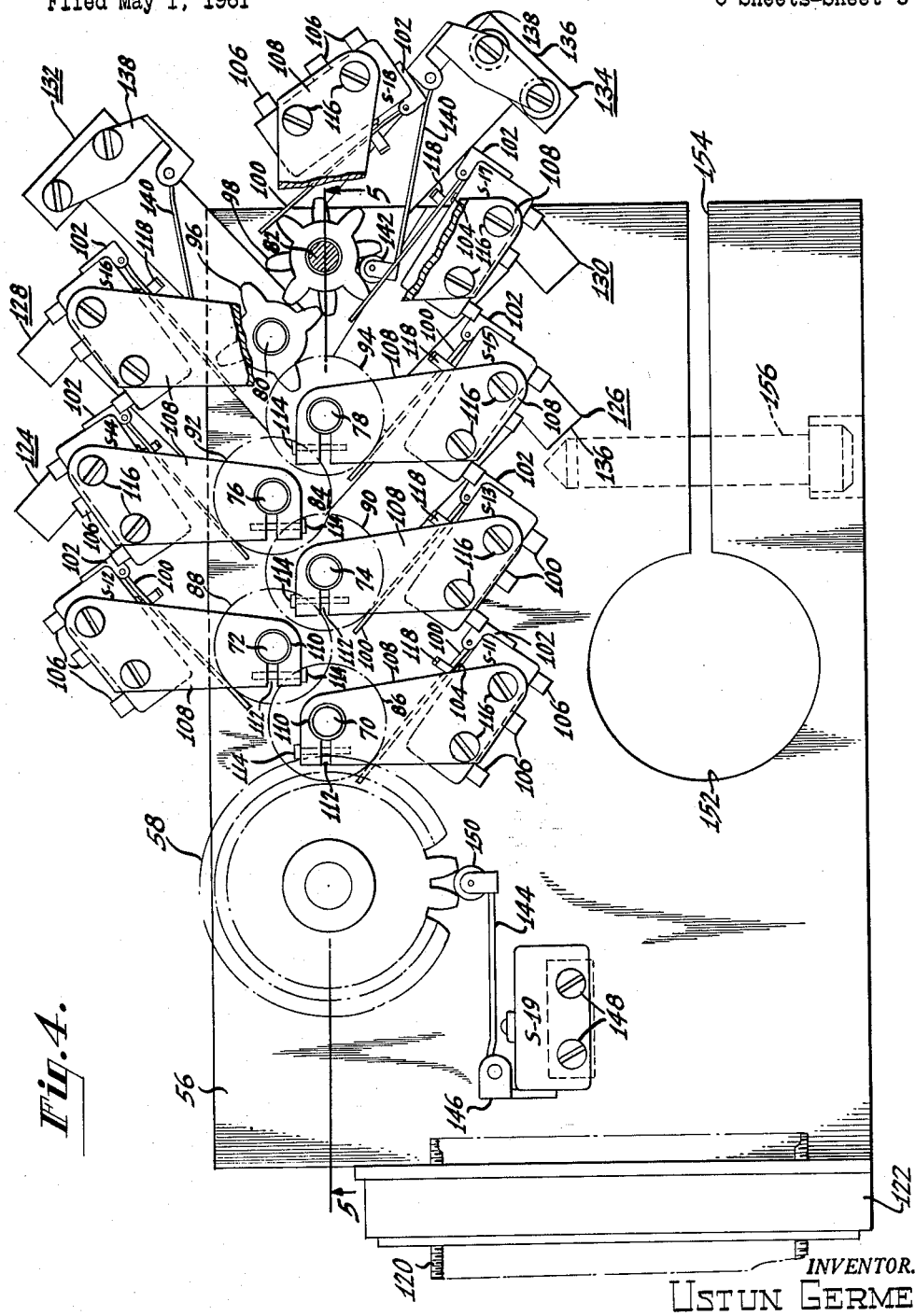
FIGURE 4 is a plan view of a position coder constructed in accordance with the invention.

A position coder 26, which will be described in greater detail in connection with FIGS. 4 and 5, is driven by the other gear 18 through a spur gear 28. The position coder translates the rotational position of the basket 10 into binary numbers, each representing a discrete position corresponding to a particular record compartment of the basket 10 which is disposed at an index station. Each record compartment is assigned a different numerical value in accordance with its position relative to a reference position, as will become clearer from the discussion of FIG. 2. The position coder 26 provides an electrical output representing the number assigned to the record compartment at an index station.

The motor 24 is controlled by control circuits 30. These circuits will be described in greater detail in connection with FIGS. 6a and 6b. The control circuits electrically control a record transfer mechanism 32 and a record transport 34. The record transport 34 includes a turntable on which one of the disc records 14 is placed by the record transfer mechanism 32. The record transfer mechanism includes a transfer arm for gripping the disc record which is positioned at the index station. The gripper arm is movable and transfers the disc record 14 at the index station from its compartment in the basket 10 to the turntable in the record transport 34. The record transport 34 also includes a pick-up arm in which a magnetic head is mounted. The magnetic head tracks the record and reads the information recorded therein. Record transfer mechanisms of the type described above are well known in the art, as represented, for example, by the Vanderzee et al. patent, 2,697,607, granted on December 21, 1954, and therefore will not be described in greater detail herein.

The magnetic head is connected to a read-write circuit 36. The circuit 36 may be constructed in accordance with known digital recording circuit design techniques. The circuit 36 operates the head either to read digital information recorded on a disc record 14 or to write digital information in the form of pulses on the disc record 14. The read-write circuit 36 may be connected to the computer system. The computer system supplies to the read-write circuit signals representing data to be stored on the record and receives signals read from the record. The computer system also supplies command signals to the control circuits 30. The command signals will include the address of any desired disc record 14. This address corresponds to the compartment of the desired disc record.

Upon receipt of command signals from the computer, the control circuit 30 responds to the signals from the position coder 26 and to the command signals and conditions the motor 24 to rotate the basket 10 to bring the selected disc record to the index station. When the selected disc record is at the index station, the record transfer mechanism is operated in a response to a control signal from the control circuit 30 to transfer the record from the basket 10 to the record transport 34. The record transport is then energized and the record is rotated for scanning by the read-write head. The read-write circuit 36 operates to energize the head to write signals on the record or to read signals already recorded thereon, as the case may be. An additional head may be mounted on the pick-up arm in advance of the read-write head for erasing information on the record.

Figure 2:
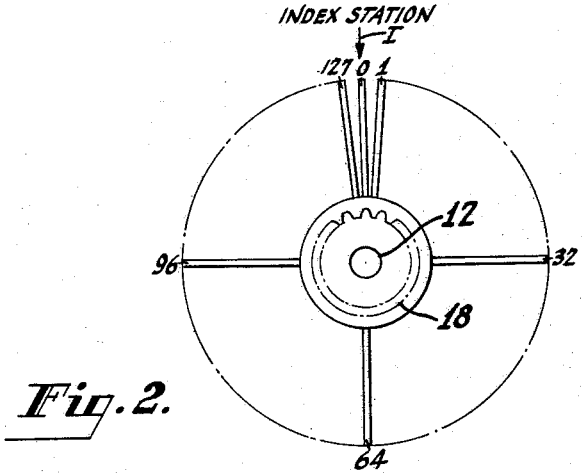
FIGURE 2 is a diagrammatic view of a record holding basket such as may be used with the present invention and in which are shown the numerical assignments of the record compartment positions.

The assignment of numerical designations to the record compartments in the basket 10 is illustrated in FIG. 2. Each compartment is at a discrete position in the basket 10. The compartment numbers also correspond to the addresses of the records contained therein. In the exemplary embodiment of the invention which is illustrated herein, the basket 10 includes 128 compartments. These compartments are numbered consecutively from a reference position and increase in value in a clockwise sense around the shaft 12. The first compartment, shown at the reference position (zero degrees), is assigned number "0." The next successive compartment in the clockwise sense is assigned the number "1." Further compartments are assigned numbers of progressively larger value. The compartment at 90° from the reference position is assigned the number "32"; the compartment at 180° is assigned the number "64"; the compartment at 270° is assigned the number "96"; the compartment immediately preceding the compartment "0" is assigned the number "127." The index point or station is at zero degrees. Compartment number "0" is at the index station represented by an arrow I in FIG. 2 of the drawings. If the basket rotates in the counter-clockwise direction as viewed in FIG. 2, the numbers passing the index station will increase in value as the basket rotates.

The compartments numbered "0" to "63," inclusive, are in one biquadrant of the basket, whereas compartments "64" to "127" are in the other biquadrant of the basket. The biquadrants of a circle include different pairs of adjacent quadrants. Quadrants are referred to herein in the conventional sense for electrical systems (i.e., the first quadrant extends from 0° to 90°, the second quadrant extends from 90° to 180°, the third quadrant extends from 180° to 270°, and the fourth quadrant extends from 270° to 360°). Accordingly, if the first and second quadrants of the basket are in the first biquadrant of the circle, the third and fourth quadrants are in the second biquadrant of the circle. Alternatively, the first biquadrant my include the fourth and first quadrants, and the second biquadrant may include the second and third quadrants.

It will be appreciated that the assignment to the compartments of numerical values which increase in value in the clockwise sense around the shaft 12 is arbitrary. The compartments may be assigned numbers which increase in value in a counter-clockwise sense, if desired. It will be noted that the number of compartments is equal to a multiple of two, in the instant case $2^7$ in order to fully utilize a binary code. Thus, all the values of a seven place binary number can be used to designate the one hundred and twenty-eight record addresses.

*Record Holding Basket*

Figure 3:
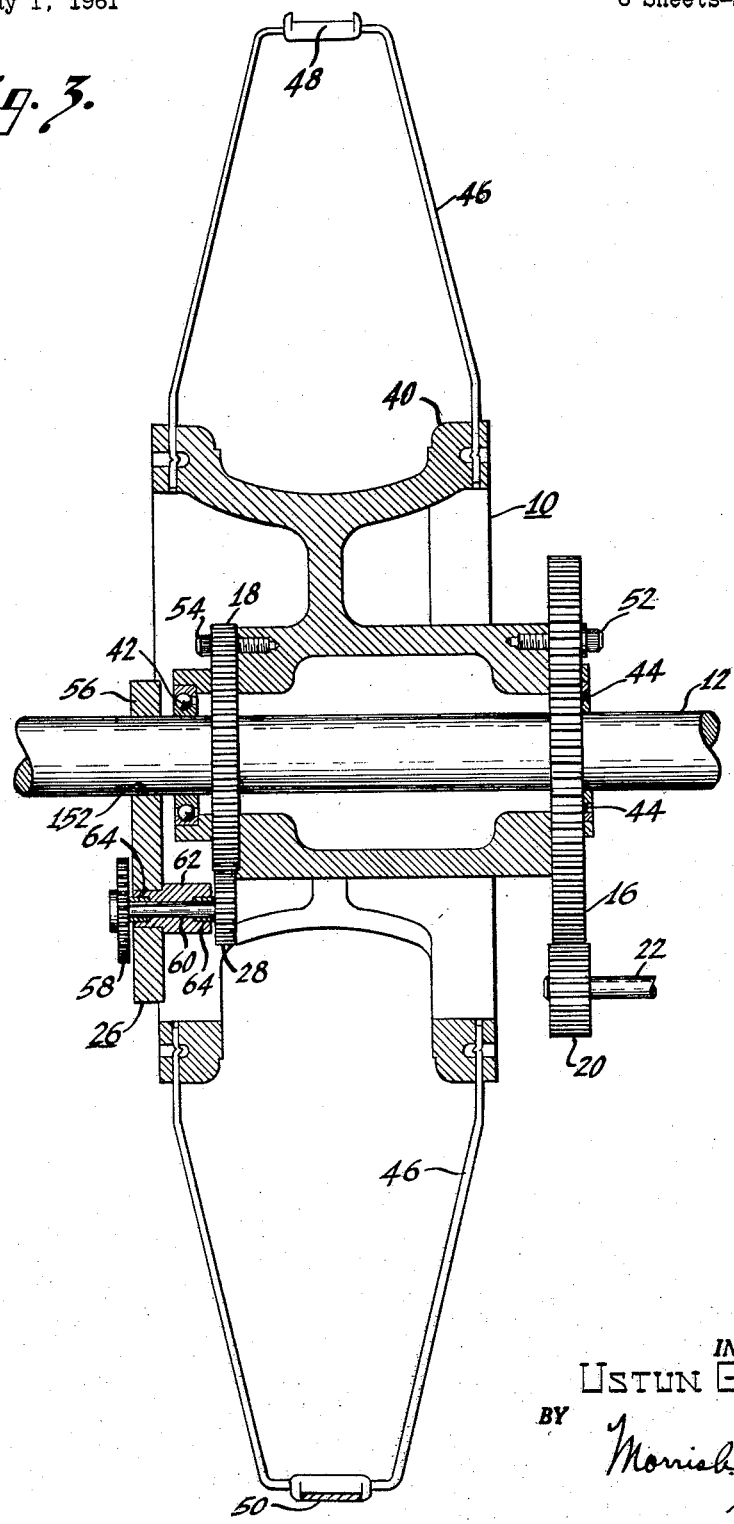
FIGURE 3 is a fragmentary view, in section, of the record holding basket with the records removed.

The basket 10 and the mechanism for rotating the basket 10 are shown in FIG. 3. The basket includes a hub 40 which may be formed from aluminum or some other light material to minimize the load on the drive motor 24. The hub is rotatably mounted on the shaft 12 by ball bearings 42 and 44. The compartments for the disc records 14 are formed by U-shaped wire spacers 46. A different numbered compartment is provided between successive pairs of the wire spacers 46. Caps 48 are secured to the outer ends of the respective wire spacers 46. Each cap may be made of plastic, molded to its wire spacer 46. A belt 50 is guided by the caps 48 and extends around the lower part of the basket 10 to prevent any records from falling out of the basket 10.

The gear 16 is secured to the hub by means of screws 52. This gear 16 cooperates with the spur gear 20 which is rotated by the motor shaft 22. The gear 18, which drives the position coder 26, and the motor driven gear 16 are positioned on the hub 40. The position coder drive gear 18 is fastened to its end of the hub 40 by means of screws 54.

The position coder includes a mounting plate 56 having a hole 152 (see also FIG. 4) through which the shaft 12 extends. Since the shaft 12 does not rotate, the mounting plate 56 may be clamped to the shaft 12 at the hole 152.

A primary gear 58 is secured to a shaft 60. This primary gear has one hundred twenty-eight (128) teeth, each corresponding to a different record compartment of the basket 10. The shaft 60 is rotatably mounted in bearings 64 which fit into a bushing 62. The spur gear 28, which is driven by the gear 18, is also mounted on the shaft 60 with the position coder primary gear 58.

*Position Coder*

FIGURE 5 shows a plurality of shafts 60, 70, 72, 74, 76, 78, 80 and 82 which are mounted on the mounting plate 56 with their axes parallel to each other. The shafts 70 to 82 are of progressively greater length. A gear train 84 including seven (7) gears 86, 88, 90, 92, 94, 96 and 98 is provided. The gears 86, 88, 90, 92, 94, 96 and 98 are rotatably mounted in staircase fashion on the shafts 70, 72, 74, 76, 78, 80 and 82, respectively.

Each of the gears has eight teeth. Alternative teeth of the upper parts of each gear are cut away so that each gear is a composite gear having an eight toothed part and a four toothed part. These composite gears are mounted on the shafts with their four toothed parts above their eight toothed parts. The four toothed and eight toothed parts of adjacent ones of the gears of the train 84 are in engagement with each other. The first gear 86 is driven by the primary gear 58. Since the first gear 86 of the gear train 84 has eight (8) teeth which engage the one-hundred-twenty-eight (128) tooth primary gear 58, the first gear 86 will turn ¼ revolution for each ¹⁄₆₄ revolution of the drive gear 58. In other words, a rotation of the primary gear 58 of two tooth spaces will rotate the first gear 86 two tooth spaces of its eight tooth part and one tooth space of its four tooth part. Since the gear ratio of adjacent pairs of gears of the gear train 84 is 2 to 1, the gears of the gear train 84 succeeding the first gear 86 will each rotate one tooth space of its four tooth part for rotation of the primary gear 58 of numbers of tooth spaces which are successively higher multiples of two. The rotation of the gears of the gear train 84 will therefore have a binary relationship to the rotation of the primary gear 58. The gears 86, 88, 90, 92, 94, 96, and 98 will represent successively higher binary orders $2^0$, $2^1$, $2^2$, $2^3$, $2^4$, $2^5$, $2^6$ and $2^7$, respectively, in accordance with their rotation.

The gears 86, 88, 90, 92, 94, 96 and 98 constitute a counter which counts, in accordance with the binary code, the number of teeth on the primary gear 58, as this primary gear rotates.

The binary output of the gears 86 to 98 of the gear train 84 is translated into electrical signals by a plurality of switches S–11 to S–18 best shown in FIG. 4. These switches S–11 to S–18 are microswitches of known type having an actuating button 104 and terminals 106. The microswitches are supported by brackets 108. The brackets 108 are mounted on the shafts 70, 72, 74, 76, 78, 80 and 82. Each bracket has a hole or opening 110 and slot 112 extending from that hole 110 to the side of the bracket. A screw 114 extends from one edge of the bracket 108 through the slot 112. The bracket 108 with its opening 110, slot 112 and screw 114 constitutes a clamping ring arrangement whereby the bracket 108 may be clamped on its shaft by tightening of the screw 114.

The microswitches are sandwiched between their respective brackets 108 and cooperating support plates (not shown). Screws 116 extend through the brackets 108 and the bodies of the microswitches and are fastened into the support plates. The support plates act as nuts and hold the microswitches on the brackets 108. The support plates carry other brackets 102. Spring mounted arms 100 for operating the actuating buttons 104 of the microswitches are pivotally supported on the brackets 102. These spring arms 100 may be spring biased by springs in their respective microswitches which bias the buttons 104 outwardly from the bodies of the microswitches. The brackets 102 also carry stops 118 which limit the movement of the spring arms 100. The spring arms 100 are biased in engagement with the four tooth parts of different gears in the gear train 84. The arms 100 are pivoted against their bias by the teeth of the gears 86, 88, 90, 92, 94, 96 and 98 with which they respectively cooperate.

The terminals 106 of the switches S–11 to S–18 are connected to lugs 120 on a terminal board 122. The terminal board 122 is fastened to the edge of the plate 56. The wires between the switch terminals 106 and the lugs 120 have been omitted to clarify the illustration.

A plurality of detent assemblies 124, 126, 128, 130, 132 and 134 respectively cooperate with the gears 88, 90, 92, 94, 96 and 98 and restrain these gears against rotation except when actually driven. Each of these detent assemblies includes an L-shaped bracket 136, clamped around its cooperating gear shaft 72, 74, 76, 78, 80 or 82 by a clamping arrangement similar to the clamping arrangement used on the switch support brackets 108. Brackets 138 are screwed onto the L-shaped brackets 136. Spring arms 140 are pivotally mounted on these brackets 138. Rollers 142 are mounted on the ends of the spring arms 140. These rollers cooperate with the teeth of the eight tooth parts of the gears 88 to 98. Thus, the rollers 142 fit between the gear teeth and are biased against the gears by their spring arms 140.

Another microswitch S–19 is mounted on the mounting plate 56 of the position coder. An actuator spring arm 144 cooperates with the switch S–19. The actuator arm is mounted on a bracket 146. The body of the microswitch S-19 is fastened to the plate 56 by screws 148. The bracket 146 is sandwiched between the body of the microswitch S-19 and the plate 56 and is held in place by the screws 148. A roller 150 is carried at the end of the actuator arm 144 and rides on the teeth of the drive gear 58. The roller 150 as shown in FIG. 4 is positioned between adjacent gear teeth. When the drive gear 58 rotates, the roller 150 rides up on a gear tooth thereof to cause the arm 144 to actuate the switch S-19.

The arrangement whereby the plate 56 of the position coder is clamped to the shaft 12 which supports the basket 10 (FIG. 3) is also shown in FIG. 4. A hole 152 slightly larger than the shaft 12 is drilled in the plate 56. A slot 154 is cut from the hole to an edge of the plate 56. A screw 156 is disposed in a threaded hole transverse to the slot 154. When the screw 156 is tightened, the hole 154 is made smaller and the plate 56 is thereby clamped to the shaft 12.

*Position Coder Operation*

Figure 6A:
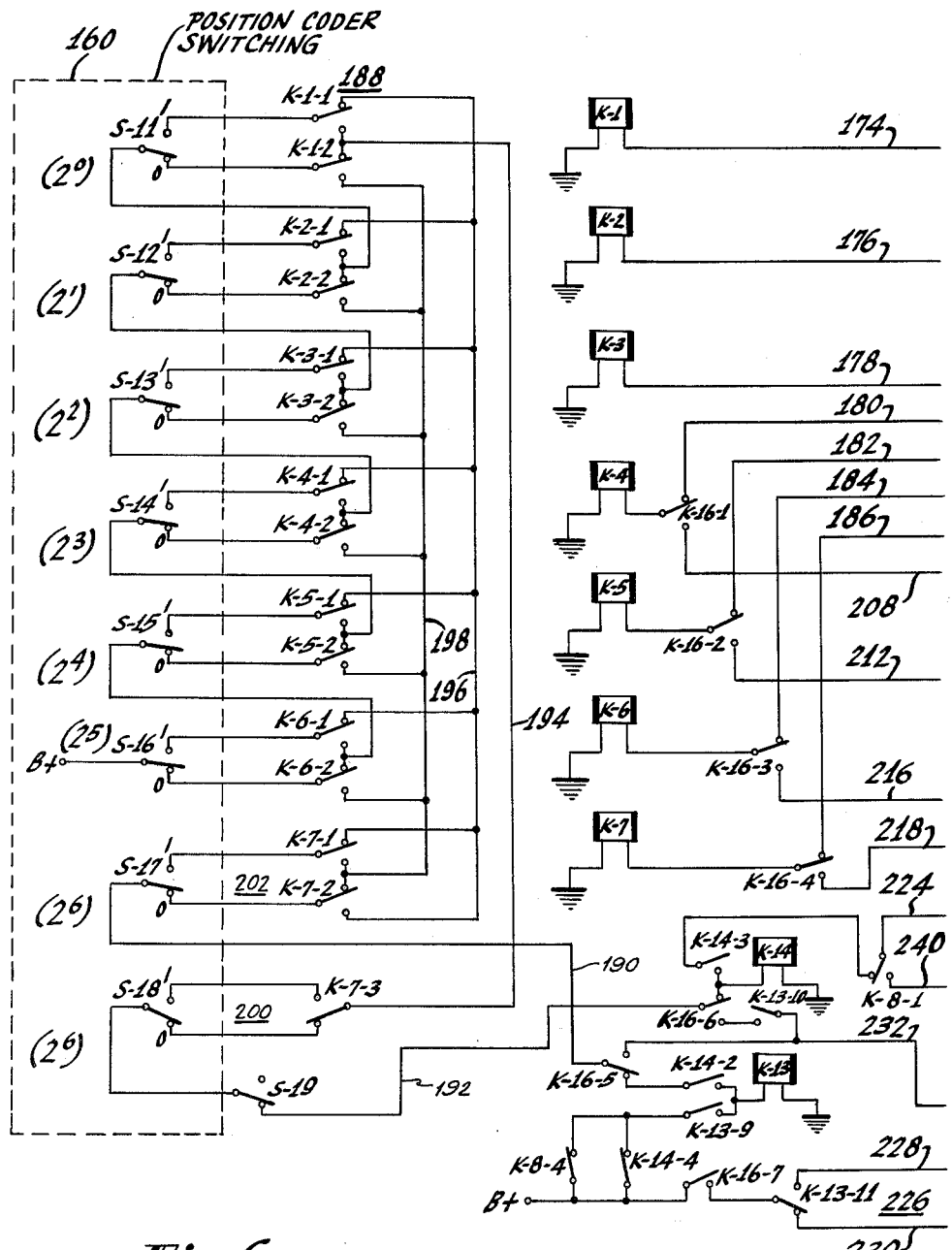
FIGURE 6a and 6b, taken together, constitute a circuit diagram of a relay switching circuit in accordance with the invention.

The switches S-11 to S-18 of the position coder provide electrical outputs representing, respectively, successively higher order binary digits of a binary number which represents the position of the basket 10. The teeth of the drive gear 58 correspond in number and position to the record compartments of the basket. Initially, the drive gear is aligned with the gears of the gear train 84 so that all of the switches S-11 to S-18 are in the same condition (all contact arms either on the "on" terminal or on the "off" terminal) when the "0" numbered compartment is at the index station. The gears 86 to 98 and the switches are shown in initial position in FIG. 4. All of the spring arms 100 are disposed on gear teeth and urged into contact with the actuator buttons 104 of the switches S-11 to S-18. As the basket 10 and the drive gear 58 rotate, the switches S-11 to S-18 each will be either in "on" or "off" condition corresponding, respectively, to binary digits of successively higher order counted by the gears 86 to 98 with which these switches cooperate. The switch conditions ("on" or "off") represent either binary "one" or binary "zero" digits. The switches S-11 to S-18 are conditioned to represent binary "zero" digits as shown in FIGS. 4 and 6a. The operation of the switches S-11 to S-18 to provide successively higher order digits of a binary number corresponding to the number of the compartment at the index station will be more apparent from the following dicussion:

When the basket rotates, the drive gear 58 turns the first gear 86 of the gear train 84. The switch S-11 will change its condition corresponding to the rotation of the drive gear one tooth space. Accordingly, the output of the switch S-11 will represent the lowest order digit ($2^0$) of a binary number representing the position of the basket. The first gear 86 drives the second gear 88 whenever the four tooth part of the gear 86 engages a tooth of the eight tooth part of gear 88. Accordingly, the switch S-12 will change condition for every other tooth of the drive gear 58. The output of the switch S-12 therefore represents the second order digit ($2^1$) of the binary number representing the position of the basket. When the gear 88 is not engaged by the first gear 86, it is restrained against rotation by its associated detent assembly 124.

The four tooth part of the second gear 88 engages the eight tooth part of the third gear 90. Accordingly, the gear 90 will rotate ¼ revolution for a rotation of four tooth spaces of the drive gear 58. The switch S-13 associated with the gear 90 will reverse its condition for every fourth tooth on the drive gear 58. The output of the switch S-13 represents the third order binary digit ($2^2$) of the binary number representing the position of the basket 10. The ratio of succeeding pairs of gears 90 and 92, 92 and 94, 94 and 96, and 96 and 98 of the gear train 84 are all two to one. Accordingly, the switch S-14 will change condition for every eighth tooth on the drive gear 58. The output of the switch S-14 will represent the fourth order binary digit ($2^3$) of the binary number representing the basket position. Similarly, the output of the switch S-15 will represent the fifth order binary digit ($2^4$) of the binary number representing the basket position. The output of the switch S-16 will represent the sixth order binary digit ($2^5$), and the output of the switch S-17 will represent the seventh or highest order binary digit ($2^6$) of the binary number representing the position of the basket. The output switch S-18 also represents the highest order binary digits. Two individual binary outputs for the highest order binary digits are used, in accordance with this exemplary embodiment of the present invention, in a manner which will be more clearly understood in connection with FIGS. 6a and 6b.

The switch S-19 is a control or gate switch which inhibits the binary output from the switches S-11 to S-18 until after the primary gear 58 has rotated through an entire gear tooth space. Rotation of the gear 58 through an entire gear tooth space corresponds to the movement of one compartment away from the index station and the next successive compartment to the index station. Accordingly, the gate switch prevents any erroneous indication of basket position by the position coder which might not correspond exactly to the one of the compartments at the index station.

*Control Circuit Generally*

Figure 6B:
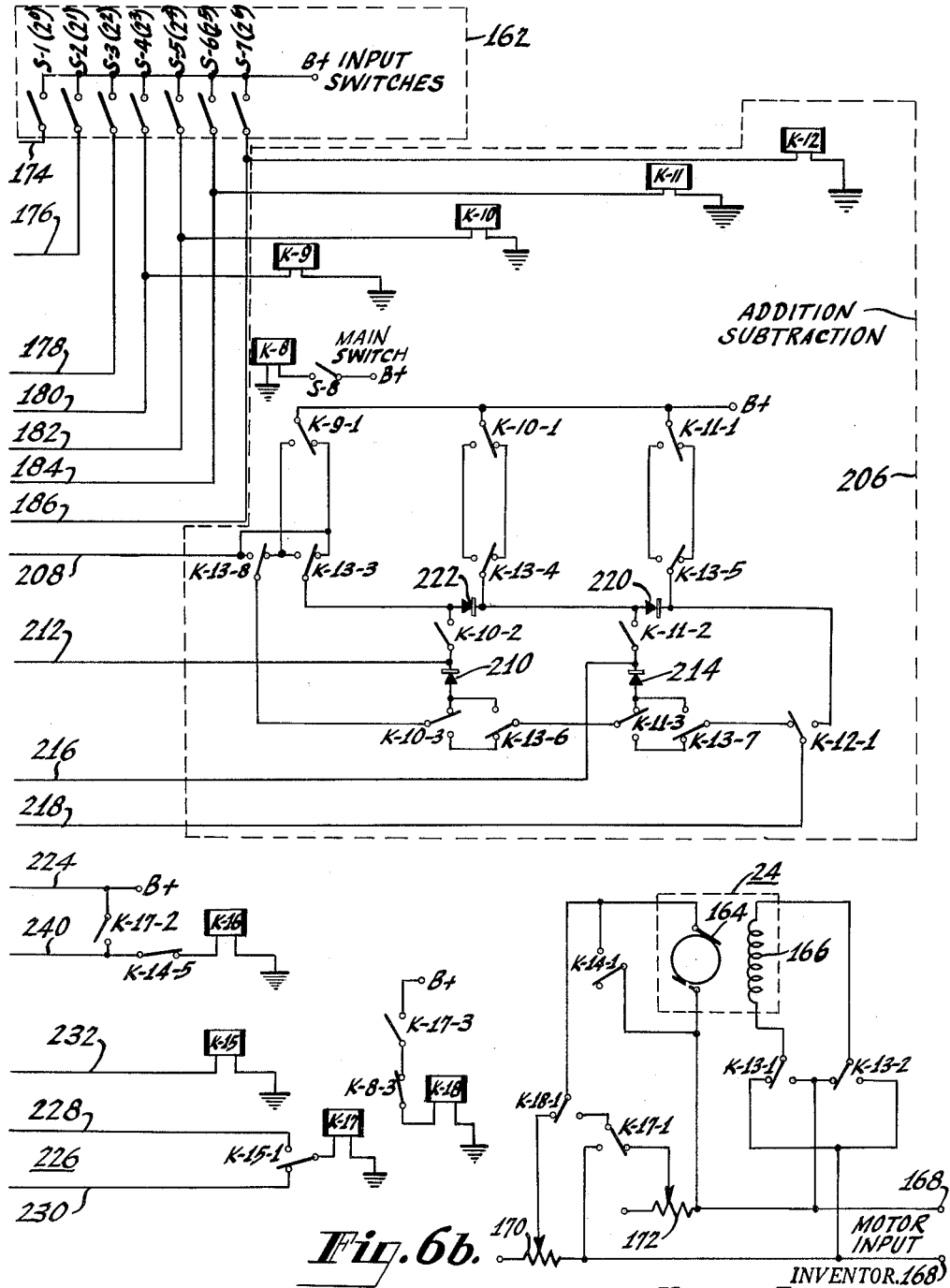

Referring more particularly, to FIGS. 6a and 6b, there is shown a relay switching circuit which provides part of the control circuit 30 (FIG. 1). The circuit illustrated in FIGS. 6a and 6b operates to control the direction and speed of rotation of the motor 24 so that any selected, numbered compartment in the basket 10 may be brought to the index station adjacent the record transfer mechanism 32 in the shortest possible time. The number of a compartment is referred to herein as the address or location of that compartment. The address of the compartment which is located at the index station is translated into a binary number by the position coder switches 160, including switches S-11 to S-18. The switch settings of the position coder switches 160 shown in FIG. 6a corresponds to the location of the "0" number compartment of the basket at the index station. Thus, the settings of the switches S-11 to S-18 correspond to binary zero digits. The gate switch S-19 is shown in FIG. 6a set in closed or enabled position. The switch S-19 assumes this setting when any of the numbered compartments in the basket 10 is disposed at the index station.

The address of the compartment which is selected by the user equipment (for example, the computer system) is stored in input switches 162, including switches S-1 to S-7. These switches may be set either manually or automatically by relay operating windings (not shown) which can be energized by the user equipment. The settings of the input switches represent a binary number of seven digits which corresponds to the address of the selected compartment which is to be rotated to the index station. This address is called "the address at the input" hereinafter for the sake of convenience. The settings of the position coder switches 160 represent the address of the record compartment which is disposed at the index station (hereinafter called "the address at the index").

As the description proceeds, it will be noted that the contacts of a relay are identified by the same letter and numeral as the relay, itself, plus another numeral (e.g., K-1 identifies a relay and K-1-1, etc., the various contacts of the relay K-1). Accordingly, a relay contact is completely specified by a letter and two numbers.

The motor 24 shown in FIG. 6b is controlled in response to the addresses represented by the position coder switches 160 and the input switches 162. The motor is a direct current motor having an armature 164 and a field winding 166. The direction of rotation of the motor may be reversed by operating a relay K-13. Contacts K-13-1 and K-13-2 control the direction of the rotation of the motor by reversing the current through the field winding 166. When the relay K-13 is not energized, the contacts K-13-1 and K-13-2 are set as shown in FIG. 6b and conditions the motor 24 for rotation in a counter-clockwise direction. The basket 10 will then rotate in a clockwise direction as viewed in FIG. 2 due to gearing 16, 20 (FIG. 1).

Power for the motor is applied to a pair of input terminals 168. The field winding 166 is connected across the terminals 168 through the relay contacts K-13-1 and K-13-2. The armature 164 is connected across the terminals 168 through the relay contact K-18-1 and an armature current limiting resistor 170. The relay contacts K-17-1 and a resistor 172 control the deceleration of the motor 24 by dynamic braking. When the relay contact K-18-1 is set in a position shown in FIG. 6b, the motor 24 will run at slow speed, since the resistor 170 will limit the armature current. The relay contact K-18-1 and the resistor 170 control the acceleration of the motor 24 by limiting the starting current to the armature 164. The relay K-18 is of the slow-to-operate type to insure that the current limiting resistor 170 will remain in the circuit until the motor 24 reaches a predetermined speed of rotation.

The motor may be stopped by dynamic braking and with an electromagnetically actuable brake of known design (not shown). A brake relay K-14 has a set of contacts K-14-1 (see lower right of FIG. 6b) connected across the armature 164 of the motor 24. When the brake relay K-14 pulls in, the contacts K-14-1 place a short circuit across the armature 164. This brakes the motor electrodynamically. Another set of contacts (not shown) of the relay K-14 may be adapted to operate the electromagnetic brake. This electromagnetic brake will be adapted to stop the motor shaft 12 (FIG. 1) when the brake relay K-14 pulls in.

The address specified by the input switches 162 is registered in relays K-1, K-2, K-3, K-4, K-5, K-6 and K-7. The input switches S-1, S-2, S-3, S-4, S-5, S-6 and S-7 are connected, respectively, to the relays K-1, K-2, K-3, K-4, K-5, K-6 and K-7 by conductors 174, 176, 178, 180, 182, 184, 186. Contacts K-16-1, K-16-2, K-16-3 and K-16-4 of a relay K-16 (FIG. 6a) are connected respectively, between the relays K-4, K-5, K-6 and K-7 and the conductors 180, 182, 184, and 186. The relay K-16, when operated to pull in, permits modification of the binary number registered in the relays K-1 to K-7 by a predetermined value as will be explained in full hereinafter.

*Comparison Circuit*

The relay contacts K-1-1 and K-1-2 are operatively connected with the switch S-11 of the position coder switches 160 in a comparison circuit 188. The comparison circuit 188 also includes relay contacts K-2-1 and K-2-2 which are operatively connected with the switch S-12; relay contacts K-3-1 and K-3-2 which are operatively connected with the switch S-13; relay contacts K-4-1 and K-4-2 which are operatively connected with the switch S-14; relay contacts K-5-1 and K-5-2 which are operatively connected with the switch S-15; relay contacts K-6-1 and K-6-2 which are operatively connected with the switch S-16; relay contacts K-7-1 and K-7-2 which are operatively connected with the switch S-17; and relay contact K-7-3 which is operatively connected with the switch S-18. Each of these operatively connected switches and relay contacts constitutes a separate stage of the comparison circuit 188. The comparison circuit has two outputs which appear separately on different output conductors 190 and 192. The switches S-11 to S-16 and the contacts of relays K-6 and K-7 are interconnected with three output conductors 194, 196 and 198. The stages, which include the cooperating sets of switch contacts S-11 to S-16 and contacts of the relays K-1 to K-6, compare the lower order digits $2^0$ to $2^5$ of the binary numbers representing the address at the index and the address at the input. The results of this comparison appear on the output conductors 194, 196 and 198.

A circuit is completed to the conductor 194 through the contacts of the relays K-1 to K-6 and their cooperating switches S-11 to S-16 from a source of operating voltage, indicated as B+, when the value of the lower order digits ($2^5$ to $2^0$) of the address of the compartment at the index is equal to the value of the lower order digits of the address at the input. Because of the switch interconnections to the output conductors, a circuit is completed from the source of operating voltage, B+, to the output conductor 198 when the lower order digits of the address at the input are greater than the lower order digits of the address at the index. A circuit is completed through the switches S-11 to S-16 and the contacts of the relay K-1 to K-6 to the conductor 196 when the lower order digits of the address at the input are less than the lower order digits of the address at the index. Accordingly, the sense of the difference between the lower order digit of the address at the index and the address at the input will be represented by output voltages on the conductors 196 and 198, respectively.

The highest order binary digits of the binary numbers representing the address at the index and the address at the input are compared separately from the lower order binary digits of these numbers in the comparison circuit 188. Two stages 200 and 202 of the comparison circuit are provided for comparison of these highest order digits. The stage 200 is used when the lower order binary digits of the address at the input and the address at the index are the same. This stage includes the relay contacts K-7-3 and the switch S-18. It will be noted (FIG. 4) that the switches S-17 and S-18 are both actuated by gear 98 of the gear train 84 which counts the highest order digit of the binary number representing the address at the index. The conductor 194 is connected through the comparison stage 200, the contacts of the gate switch S-19, the conductor 192, and relay contacts K-16-6 to the brake relay K-14. Accordingly, when the highest order digits of both addresses are the same and the lower order digits of both addresses are also the same, a circuit will be completed through the comparison circuit 188, from the source of operating voltage B+, to energize the relay K-14. The relay K-14 will then be pulled in and the motor 24 will stop.

One or the other of the conductors 196 and 198, which have outputs representing the sense of the difference between the address at the index and the address at the input may be connected by way of the stage 202 of the comparison circuit 188, another contact K-16-5 of the brake control relay K-16 and a contact K-14-2 of the brake relay K-14 to the relay K-13 which controls the direction of rotation of the motor 24.

The comparison of the highest order digits ($2^6$) of the address at the index and the address at the input separately from the lower order digits of these addresses provides, in accordance with a feature of this invention, for the rotation of the shaft 12 through the shortest possible arc to bring the desired compartment represented by the address at the input to the index station. The results of the comparison of the highest order digits indicates whether the address at the input and the address at the index are both in the same biquadrant of the basket 10. The direction of rotation of the shaft necessary to bring the address at the input to the index station will depend upon the biquadrant in which the compartments represented by address at the index and the address at the input are located and, also, upon the sense of the differences between the address at the input and the address at the index.

*Comparison Circuit Operation*

Referring again to FIG. 2, it will be noted that the compartments numbered "0" to "63" are in the first biquadrant of the basket 10 and the compartments numbered "64" to "127" are in the second biquadrant of the bracket 10. The comparison circuit 188 utilizes the sense of the difference between the numerical values of the address at the input and the address at the index to control the direction of basket rotation. However, the comparison circuit also derives information as to the biquadrant of the basket in which the compartments represented by the addresses at the input and at the index are disposed. The purpose of this is to establish basket rotation through the shortest possible arc regardless of the biquadrant of the address at the input and the address at the index. It will become apparent as the description proceeds, that the direction of basket rotation is related to the sense of the difference between the lower order digits of the address at the input and the address at the index. If the compartments represented by these addresses are in the same biquadrant, the basket rotates in one direction, depending on the sense of this difference. If these compartments are in different biquadrants, the basket rotates in the opposite direction for the same sense of the difference.

Let it be assumed, for example, that compartment number "63" is the selected compartment and compartment number "8" is located at the index. Switches S–1 to S–6, inclusive, will be closed and switch S–7 will be open to represent the binary address of the desired compartment "63" at the input. The switch S–14 will be actuated and will reverse its contacts to represent the address of compartment number "8" at the index station. The relays K–1 to K–6 will be energized. Relay K–7 will not be energized. The contacts of relays K–1 to K–6, inclusive, in the comparison circuit 188 will be reversed to represent the address of compartment number "63." A circuit will then be completed from B+ to the output conductor 198 through the switch contacts S–16 and the relay contacts K–6–2 to indicate that the sense of the difference between the lower order digits of the address at the index and the address at the input is positive (i.e., the lower order digits of the address at the input is greater than the address of the lower order digits at the index). The contacts S–17 and K–7–1, K–7–2 and K–7–3 of the switches and relays representing the highest order digits of the address input and the address at the index remain as shown in FIG. 6a, since both the address at the input and the address at the index are in the first biquadrant. Accordingly, the output conductor 190 of the comparison circuit 188 will be connected to conductor 198. An output voltage will be applied to the motor direction control relay K–13, causing the relay K–13 to pull in. When the relay K–13 pulls in, the motor 24 is conditioned to rotate the basket (FIG. 2) in a counter clockwise direction. Thus, the sense of the difference betwen the lower order digits of the address at the input and the address at the index directly controls the direction of rotation of the basket 10, when the compartment represented by both addresses are in the same biquadrant of the basket 10. The foregoing would also be true if both addresses were in the other, but same biquadrant.

Assuming, again, for purposes of illustration that the address at the index is "127" and the address at the input is "2." Obviously, the basket will move through the shortest arc by rotation in a counter-clockwise direction through the reference position (compartment number "0") for a distance of three compartment spaces. Switch S–2 of the input switches 162 will be closed to represent the binary value of the address of compartment number "2." The setting of switches S–11 to S–18 of the position coder switches 160 will be reversed to represent the address of compartment "127" at the input. A circuit will be completed from B+ to the conductor 196 to indicate that the sense of the difference between the lower order digits of the address at the input and the address at the index is negative. This circuit will be completed through a contact of the switch S–16 and contacts of the relay K–6. The output conductor 196 will be connected through the stage 202 of the comparison circuit 188 to the output conductor 190, since the position of the switch S–17 will be reversed. Accordingly, relay K–13 will pull in. The basket 10 will be conditioned to rotate in a counter-clockwise direction whereby compartment number "2" will be brought to the index station through the shortest possible arc of rotation (three compartment spaces) and, therefore, in the shortest possible time.

It will be noted that the sense of the differences of the address chosen for the first example was different than the sense of the difference chosen for the second example. However, the direction of rotation of the basket 10 was the same (i.e., counter-clockwise). The sense of rotation is determined by both (*a*) the sense of the difference between the lower order digits of the input and index addresses, and (*b*) the relative biquadrants in which compartments represented by the input and index addresses are located.

*Speed Control Circuit*

Other circuits are included in FIGS. 6a and 6b for providing control over the speed of rotation of the basket so as to further decrease the time required to locate any compartment of the basket at the index station. A circuit is provided for conditioning the motor 24 to rotate at maximum speed when the desired compartment whose address is represented by the input switches 160 is outside of a "slow speed zone." This slow speed zone, in the illustrated apparatus, includes sixteen compartment spaces, eight on each side of the desired compartment. However, the slow speed zone may be larger or smaller depending upon the size and inertia of the basket, the maximum speed of rotation of the motor, the weight of the records and the like. An addition and subtraction circuit 206 is provided for adding to or subtracting from the numerical value of the address represented by the input switches 162, a number having a numerical value of eight.

Referring again to FIG. 2, it will be noted that, when the basket is rotating in a clockwise direction, higher numbered compartments will reach the index station before the desired compartment, whereas when the basket is rotating in a counter-clockwise direction, lower numbered compartments will reach the index station before the desired compartment. Accordingly, the addition-subtraction circuit 206 adds the number "8" to the address of the desired compartment represented by the input switches 162 when clockwise rotation is specified by the comparison circuit 188, and it subtracts the number "8" from the address at the input when the comparison circuits dictates counter-clockwise basket rotation.

The adding and subtracting circuit 206 includes four relays, K–9 to K–12, inclusive. These relays operate contacts K–9–1, K–10–1, K–11–1 and K–12–1. The condition of each of these relay contacts K–9–1 to K–12–1, inclusive, individually represents the binary digits of the higher orders $2^3$ to $2^6$ of the address at the input. The settings of the motor direction control relay contacts K–13–3, K–13–4, K–13–5, K–13–6, K–13–7 and K–13–8 represent the binary digits that are added to or subtracted from the binary digits represented by the setting of the relay contacts K–9–1 to K–11–1. Other contacts of the relays K–10 to K–12, namely K–10–2, K–10–3, K–11–2 and K–11–3, control the transfer of carry or borrow digits.

When the circuit 206 is conditioned to add, the contacts K–13–3 to K–13–8 are set as shown in FIG. 6a. If switches S–4 and contacts K–9–1 are set as shown in FIG. 6a, thus representing a "zero" fourth order digit ($2^3$) of the address at the input, a circuit will be completed from B+ through the contacts K–9–1 and a conductor 208 to the contacts K–16–1. When the relay K–16 pulls in, relay K–4 will also pull in. A binary "one" bit will be registered by the relay K–4 and the fourth order ($2^3$) digit of the address at the input will be modified. If the $2^3$ digit of the address at the input is already a binary "one" digit, an output representing a carry bit will be transferred through the contacts K–13–8, contacts K–10–3, a diode 210, a conductor 212 and the contacts K–16–2 to operate the relay K–5. Accordingly, the binary number registered in relays K–1 to K–7, inclusive, will be increased in numerical value by eight.

A circuit through the contacts K–10–3, K–13–6, K–11–3, a diode 214, a conductor 216 and the contacts K–16–3 will be completed to the relay K–6 in case the address at the input already includes a binary "one" ($2^5$) digit. If the $2^5$ digit of the address at the input is also a binary one digit, the binary one digit signal will be carried through the contacts K–11–3, K–13–7, K–12–1, a conductor 218, and the contacts K–16–4 to the relay K–7. If all of the four highest order digits ($2^3$ to $2^6$, inclusive) are binary "one" digits, their value will be changed by the addition circuit 206 to binary "zero" bits. The numbers registered in the relays K–1 to K–7 will then be determined by the input switches S–1, S–2 and S–3. Thus, in every case, the modified value of the address at the input, which will be registered in the relays K–1 to K–7, will be eight compartment spaces from the actual address at the input in a clockwise direction therefrom.

Subtraction is accomplished in a manner similar to addition. The settings of the contacts K–13–3 to K–13–8 will be the reverse of the settings of those contacts shown in the drawings. If the $2^3$ digit is a binary "one" digit, the digit registered in the relay K–4 will be a binary "zero" digit and the other digits will remain unchanged. However, if the $2^3$ digit is already a binary "zero" digit, an output representing a borrow digit will be transferred through the contacts K–10–2, K–11–2 and K–12–1 to modify the number registered in relays K–1 to K–7 to a new number less by "8" than the number of the address at the input. Diodes 220 and 222 are provided to prevent the flow of currents along improper paths in the addition-subtraction circuit 206.

A command to select a new or desired address appearing at the input is executed by a cyclic operation of a main switch S–8. This switch may be on the control panel of the random access memory. Alternatively, the switch S–8 may be operated remotely by the user equipment, such as the computer system. The switch S–8 controls the energization of a relay K–8. This relay has a plurality of contacts. One of these contacts, K–8–1, is connected to the source of operating voltage, B+, through a conductor 224. The source, B+, is connected through the contacts K–8–1 and a holding contact K–14–3 of the brake relay K–14 to the brake relay K–14.

When relay K–8 pulls in, relay K–14 drops out and circuits for braking the motor including contact K–14–1 will open. Another contact K–8–2 of the relay K–8 controls the power to the motor. The contacts K–8–1 and K–8–2 operate alternatively so that the motor brakes may be released, motor control operations completed, and motor power applied in time sequence, as will be explained in full hereinafter.

Relay contacts K–8–3 and K–8–4 play a part in controlling the speed of the motor. The relay K–17 is controlled by another relay K–15 and the motor reversing relay K–13. The relay K–15 stores the results of the comparison between the address at the index and the modified (plus or minus "8") address at the input. A comparison circuit 226 including the relay contacts K–15–1 and K–13–11, which are connected by conductors 228 and 230, operate the speed control relay K–17. The comparison circuit 226 derives information from the comparison of the address of the index with (a) the desired address at the input and with (b) the modified address at the input, and determines whether the compartment represented by the address actually represented at the input is within the slow speed zone of basket rotation. The relay K–15 is connected to the output conductor 198 of the comparison circuit 188 through the relay contact K–16–5 and a conductor 232. Other contacts of relays K–8, K–13, K–14, K–16 and K–17 operate in the system to control the speed of the motor 24.

Sequence of Operations

The sequence of operations of the control system illustrated in FIGS. 6a and 6b is as follows:

(1) Initialize—Power is applied from the source of operating voltage, B+, when address at the index corresponds to the address at the input so as to brake the motor 24.
(2) Store—The address of selected compartment is stored in the input switches 162.
(3) Compare—The address at the input is compared with the address at the index so as to derive the sense of rotation of the basket 10.
(4) Store—The sense of rotation is stored in relay K–13.
(5) Modify—The address at the input may be modified by a numerical value of plus or minus "8" depending upon the results of comparison in operation 3.
(6) Compare—The modified address at the input is compared with the address at the index.
(7) Store—The result of the comparison in operation 6 is stored in the relay K–15.
(8) Compare—The results of the comparison in operation 3 and the comparison in operation 6 are compared to determine whether address at the input is in the slow speed zone (plus or minus "8" compartments) from the existing address at the index.
(9) Store—The results of the comparison in operation 8 are stored in the speed control relay K–17.
(10) Run—Motor braking is released and the motor turns at high speed or at low speed depending upon the information stored in the relay K–17 in operation 9.
(10a) Decelerate—Motor speed is reduced, when the address at the index is plus or minus eight compartments from the desired address at the input.
(11) Stop—Motor braking is applied through operation of the brake control relay K–14 when the address at the input equals the new address at the index.

Operation of Control Circuit

The operation of the control circuitry illustrated in FIGS. 6a and 6b will be better understood from a consideration of a specific example. Let it be assumed that the random access memory is operating and that compartment number "120" is at the index station. Appropriate control signals have been applied from the control circuits 30 (FIG. 1) so that record number "120" has been transferred by the record transfer mechanism 32 to the record transport 34. Other control signals from the control circuits 30 have initiated operation of the record transport 34. Reading and/or writing has been accomplished by the read-write circuit 36 under control of the computer system. The record number "120" has been transferred back to its compartment in the basket 10 after an appropriate signal from the control circuit 30 has again actuated the record transfer mechanism 32. The random access memory is then ready to receive a command to select the next record desired by the computer system. It will be assumed, for purposes of illustration, that the next record is in compartment number "96" of the basket 10.

The circuitry shown in FIGS. 6a and 6b is initialized at the termination of the selection and transfer cycle of record in compartment number "120."

The address of compartment number "120" will be stored in the input switches 162. Switches S–7, S–6, S–5 and S–4 will be closed, while the other switches S–1, S–2 and S–3, inclusive, will be open. The position coder switches 160 store the address of the compartment at the index station, switches S–14, S–15, S–16, S–17 and S–18, inclusive, will be reversed (to indicate binary "1" bits) and switches S–11, S–12 and S–13 will be in the position shown in FIG. 6a. Relays K–4 to K–7 will then pull in. Accordingly, a circuit will be completed in the comparison circuit 188 from B+ to the output conductor 192. Energizing voltage will be applied from the output conductor 192 through the relay contacts K–16–6 to the relay K–14. The relay K–14, it will be recalled, is the brake control relay. When that relay K–14 pulls in, its contacts K–14–1 to K–14–4, inclusive, reverse their positions from those shown in FIG. 6a. The motor 24 will be braked through the relay contact K–14–1. A holding circuit for relay K–14 will be completed from B+ through the conductor 224, contact K–8–1 and the holding contacts K–14–3 of the relay K–14.

When record number "120" is returned to its compartment, the computer system transmits the address of the selected record number "96" to the input, and the input switches register the address of compartment "96." Two switches S–7 and S–6 close while the other output switches S–1, S–2, S–3, S–4 and S–5 open. The relays K–6 and K–7 associated with the closed input switches S–6 and S–7 pull in. The address of compartment "120" is still registered in the position coder switches 160.

The address of compartment number "96" at the input is compared with the address of compartment number "120" at the index by means of the comparison circuit 188. A circuit is completed from B+ through the switch S–16, the contacts K–6–1, the switch S–15 and the contacts K–5–1 to conductor 195. This circuit is broken at the switch S–17 of the comparison circuit stage 202 in which the highest order digits ($2^6$) of the addresses are compared. Accordingly, no output voltage appears on the output conductor 190, and the motor direction control relay K–13 is not energized. It will be recalled that, when the motor control relay is not energized, the contacts K–13–1 and K–13–2 do not pull in and the motor 24 is conditioned to rotate the basket 10 in a clockwise direction. The shortest path from compartment "96" to compartment "120" is in a clockwise direction. Accordingly, the desired clockwise rotation of the basket is derived.

During circuit operation to select compartment "96," relay K–14 remains pulled in. Accordingly, the basket does not rotate.

The main switch S–8 may be closed on command from the computer while the address of the desired compartment is registered in the input switches 162. Alternatively, switch S–8 may be closed after a delay to allow time for the first comparison of the address at the index and the desired address at the input. In the event that switch S–8 is actuated simultaneously with the input switches 162, the relay K–8 should be a slow-to-operate relay.

When the relay K–8 pulls in, its contacts K–8–1 open the circuit from B+ to the brake control relay K–14. The braking contacts K–14–1 open. However, the motor 24 is not energized since one power input terminal 168 is disconnected from the motor 24 by the main relay contacts K–8–2.

A circuit is completed from B+ through the conductor 224, the main relay contact K–8–1, a conductor 240, and the normally closed brake relay contacts K–14–5 to one of the speed control relays K–16. When relay K–16 pulls in, the addition-subtraction circuit 206 is connected through the contacts K–16–1 to K–16–4 to the relays K–4 to K–7, and the address at the input which is registered in the relays K–1 to K–7 is modified. The address at the input is thereby artificially advanced to an address which is eight compartments closer to the address at the index. The binary number 1 1 0 0 0 0 0 representing the address of compartment "96" at the index is changed to the binary numbers 1 1 0 1 0 0 0 representing the address of compartment "104." Compartment "104" is eight compartments closer to compartment "120," which is disposed at the index, than is compartment "96." The operation of the addition and subtraction circuit to add a binary one digit in the fourth place of the binary number representing the address at the input was explained above.

The modified address for compartment "104" is compared with the address of compartment "120" in the comparison circuit 188. Since the modified address at the input ("104") is still smaller than the address at the index ("120"), no output voltage appears at the output conductor 190 of the comparison circuit. If, on the other hand, the address at the input differs from the address at the index by eight or less, the modified address at the input will be larger than the address at the index. Thus, in the instant case, an output voltage would appear on the output conductor 190 if the actual address at the input were the address of compartment "116," for example.

The output conductor 190 is connected through the closed contacts K–16–5 of the relay K–16 and the conductor 232 to the relay K–15 which stores the results of the comparison of the modified address at the input with the address at the index. The results of both comparisons of the actual and modified addresses at the input with the address at the index are compared with each other in the comparison circuit 226. The result of the initial comparison is stored in the relay contacts K–13–11. The results of the second comparison is represented by the setting of the relay contact K–15–1. In this specific example, a circuit to the speed control relay K–17 is completed from B+, through the relay contacts K–16–7 and the comparison circuit 226. If, on the other hand, the results of the initial and second comparisons differ, as would be the case if the desired compartment represented by the actual address at the input were already in the slow speed zone within eight compartments of the index station, the relay K–17 would not pull in.

A holding circuit is provided for relay K–13. Thus, if the relay K–13 was caused to pull in due to an output voltage on the conductor 190, a circuit would be completed from B+, through the relay contacts K–8–4 and the holding contacts K–13–9 of the relay K–13, during the initial comparison of the actual address at the input with the address at the index. When the relay K–8 pulls in, relay K–14 drops out. Relay contacts K–14–4 are shown for the normally de-energized state of the relay K–14. Thus, the holding circuit for the relay K–13 will still be completed through the holding contacts K–13–9 and the contacts K–14–4.

In the specific example, the relay K–17 pulls in to indicate the address at the input is more than eight compartments from the index. Accordingly, the information stored in the relay K–17 is the command to rotate the basket 10 at high speed. The relay contacts K–17–1 complete a circuit directly to the motor armature from the motor input terminals 168. The main relay contacts K–8–2 are still open, however, so that the motor does not yet start to rotate. Motor rotation starts when the main switch S–8 again opens. The command to open the main switch S–8 is given by the computer system a predetermined time after the switch S–8 is closed. For example, the computer may provide a pulse to a relay (not shown) which controls the main switch S–8. That relay (not shown) will remain pulled in for the duration of the pulse. The pulse duration is selected to provide sufficient time for the comparison of the modified address with the address at the index and for the operation of the relays K–15 and K–17. The relay K–18 will be energized through the contacts K–17–3 and K–8–3 from the source of operating voltage at B+, while main switch contacts K–8–2 are closed.

The relay K–18 is slow to operate. Initially, the current limiting resistor 170 will be in the armature circuit of the motor. After a predetermined time, the contacts K–18–1 will reverse, thus cutting out the current limiting resistor 170, and full motor power will be applied to the motor 24 so that the motor will rotate at its highest speed.

The contacts K–8–1 of the main relay K–8 will also open when the main switch S–8 is opened. However, a holding circuit to the relay K–16 is completed to that relay from B+ through the contacts K–17–2 and K–14–5.

Since relay K–16 remains pulled in, the modified address at the input will remain stored in the relays K–1 to K–7. Thus, as the basket rotates, the position coder will compare the modified address with the addresses of the compartments at the index station as the compartments arrive in sequence at the index station.

The relay K–15 will become energized when the compartment represented by the modified address at the input passes the index. Since the position coder switches 160 will represent an address less than the modified address at the input, the circuit to the relay K–17 opens at the contacts K–15–1. Contacts K–17–2 will then open and cause relay K–16 to drop out. Contacts K–16–7 open the circuit to relay K–17 and prevent any vibration of the contacts of relay K–17.

In the event that the basket rotates at high speed in a counter-clockwise direction, rather than in clockwise direction, as in the herein specified example, the relays K–13 and K–15 would be both energized. When the address at the index and the modified address at the index become equal to each other, a voltage will appear on output conductor 192 of the comparison circuit to indicate this equality. Thus voltage would be applied to the relay K–15 through the pulled-in contacts K–16–6 and K–13–10. The relay K–15 will drop out only after the compartment represented by the modified address at the input passes the index, as in the case of clockwise basket rotation in the example which is specified above.

When the relay K–17 drops out, a circuit is completed across the armature 164 through relay contacts K–17–1, the resistor 172, and the contacts K–18–1 which are slow to drop out. The motor is braked electrodynamically and the motor begins to slow down. The slow-to-operate relay K–18 drops out soon after the relay K–17, since the contacts K–17–3 open. Accordingly, the current limiting resistor 170 will also be inserted in the armature circuit of the motor 24 and the speed of the motor will be reduced. The actual address at the input for compartment number "96" is registered in the relay K–1 to K–7 when the speed control relay K–16 drops out. In other words, as the desired compartment number "9" of the basket 10 moves slowly toward the index station, the comparison circuit 188 compares the address of compartment number "96" successively with the address of each compartment number "103," "102," "101," "100," "99," "98" and "97." When compartment number "96" reaches the index station, an output voltage will appear on the output conductor 192 and brake relay K–14 will pull in. Since the motor is moving slowly, it will stop at the index station.

*Conclusion*

From the foregoing description, it will be apparent that there has been provided improved control apparatus which is suitable especially for use in locating an object which is in any selected one of a plurality of possible positions, the selection being made at random.

The address at the input and the address at the index may be compared in various ways in order to determine the shortest path of movement of the object to a selected position. For example, the addresses of the selected compartment and the compartment initially at the index station may be compared to determine if these compartments are in different quadrants on opposite sides of the reference position. This determination will reveal whether or not the shortest path of movement for the object will be through the transition at the reference position. The direction of rotation may then be controlled directly in accordance with the sense of the difference between the addresses at the index and at the input, except if these addresses represent compartments in quadrants on opposite sides of the reference position. The system illustrated in the drawings and described in detail herein is preferred, since it has advantages in circuit simplicity and in economy of switches in the address comparison circuits.

The system has been described as incorporated in an improved random access memory device wherein an array of records is moved. It will be apparent that the system is equally applicable in apparatus where a record transducing unit, such as includes a magnetic head, is the movable element. A control system having the inventive features described herein is also generally useful in positioning any movable or rotatable object, such as a shaft, and other motor controlled devices. Many variations in the system and in components thereof will undoubtedly suggest themselves to those skilled in the art. The foregoing description should be, therefore, taken as illustrative and not in any limiting sense.

What is claimed is:

1. A system for positioning an object at any one of a plurality of discrete positions numbered consecutively around a closed path from a reference position along said path, said system comprising means for translating the position of the object into a first number representing its initial position in said path, comparison means for comparing said first number with a second number representing the desired position of the object in said path and for deriving an output which depends upon the difference therebetween, means for comparing at least portions of said first and second numbers and for modifying said output when the shortest distance along said path between said initial and desired positions is through said reference position, and means responsive to said modified output for moving the object through said shortest distance along said path from said initial position to said desired position.

2. A system for controlling the positioning of an object at any one of a plurality of discrete positions numbered consecutively around a closed path from a reference position along said path, said system comprising means for translating the position of the object into a first number representing the number of its initial position, means for comparing said first number with a second number representing the number of the desired position of the object for providing an output which is respectively of a first value and a second value depending upon the sense of the difference between said first and said second numbers, means responsive to at least portions of said numbers for determining whether or not the shortest path for the object to said desired position is through said reference position and for interchanging for the value of said output from said first value to said second value or vice-versa, and means responsive to said interchanged output for moving the object in one direction when said output is said first value and in the opposite direction when said output is said second value.

3. A numerically controlled object positioning device comprising means for moving an object from an initial position to any desired one of a plurality of positions numbered consecutively around a closed path having two biquadrants, means for comparing derived numbers corresponding to said initial and said desired positions which each other for determining whether or not said different positions are disposed in a common biquadrant, means for further comparing at least parts of said numbers for determining the relative disposition of said initial and desired positions with respect to each other, and means responsive to both said number comparing means for controlling the direction of movement of said moving means so as to move the object for the same relative disposition of said initial and desired positions in one direction when said initial and desired positions are disposed in a common biquadrant and in an opposite direction when said initial and desired positions are in different biquadrants.

4. A system for positioning an object which is rotatable around a generally circular path having a plurality of discrete positions numbered consecutively around said path, one-half of said positions being located in one biquadrant of said path and the other half of said positions being located in the other biquadrant of said path, which system comprises means for comparing with each other certain corresponding digits of a pair of derived numbers representing the initial position and the desired position of the object for deriving the sense of the difference therebetween, means for comparing with each other certain other corresponding digits of said numbers to determine whether or not said initial and desired positions are in a common biquadrant of said path, and means controlled by both said comparing means for rotating the object into said desired position in a direction which depends directly on said sense of said difference when said initial and desired positions are in a common biquadrant and inversely on said sense of said difference when said initial and desired positions are in different biquadrants.

5. A system for positioning an object which is rotatable around a closed path at any of a plurality of discrete positions numbered consecutively from a reference position around said path, half of said positions starting from said reference position being located in one biquadrant of said path and the other half of said positions being located in the other biquadrant of said path, said system comprising means for translating the position of the object into a multi-digit binary number representing its position in said path, means for providing another multi-digit binary number representing the desired position of said object, means for comparing corresponding digits of the binary number representing said desired position with said binary number representing said initial position of the object with each other for deriving information respecting the sense of the difference between said digits and whether or not said desired and initial positions are in the same biquadrant, and means for rotating the object in a direction depending directly upon the sense of said difference when said initial position and said desired position are in the same biquadrant and depending inversely upon the sense of said difference when said initial position and said desired position are in different biquadrants.

6. A system for positioning an object at any one of a plurality of discrete positions numbered consecutively from a reference position around a closed path, said system comprising means for translating the position of the object into a first multi-digit binary number representing its present position in said path, comparison means for comparing the lower order digits of said first derived multi-digit binary number with corresponding lower order digits of a second derived multi-digit binary number representing the desired position of the object in said path and for deriving an output which depends upon the sense of the difference therebetween, means for comparing the highest order digits of said first and second binary numbers and for modifying said output when said highest order digits are different, and means responsive to said modified output for moving the object along said path from said present position to said desired position.

7. A system for positioning an object at any one of a plurality of discrete positions numbered consecutively from a reference position around a closed path which comprises position coder means for translating the position of the object into a multi-digit binary number representing an initial position of the object in said path, input means for providing another multi-digit binary number representing the desired position of the object in said path, a comparison circuit including (1) a plurality of cascade connected stages in which corresponding digits of said numbers are compared with each other, those of said stages which compare all except the higher order digits of said numbers having a pair of outputs, and (2) means for applying a voltage alternatively to different ones of said pair of outputs depending upon the sense of the difference between the lower order digits of said numbers, said outputs being connected to the one of said stages in which the highest order digits of said numbers are compared with each other, said last-named stage having an output and including means for connecting one of said pair of outputs to said last-named stage output when said highest order digits are the same and for connecting the other of said pair of outputs to said last named stage output when said highest order digits are different, and means responsive to said last-named stage output for moving the object along said path into said desired position in one direction or in an opposite direction depending upon the presence or an absence of an output voltage at said last-named means output.

8. The invention as set forth in claim 7 including a third output from those of said stages which compare said lowest order digits, said comparison circuit including a further stage for comparing said highest order digits with each other, said other stage having an output, means included in said comparison circuit for providing an output voltage at said third output, if and only if, said lowest order digits are equal to each other, means provided by said other stage for applying an output voltage to said further stage output when said highest order digits are equal to each other and when an output voltage appears at said third output, and means connected to said further stage output for stopping movement of the object when an output voltage appears at said further stage output.

9. A system for moving a rotatable object having a plurality of discrete positions numbered consecutively from a reference position around the path of rotation thereof so as to locate any of said positions at an index point along said path which comprises means for comparing at least parts of the number of the one of said positions which is initially at said index point with at least parts of the number of another of said positions which is desired at said index point to derive the sense of the difference therebetween, and means responsive to said comparing means for rotating the object respectively (1) in a first direction and (2) in a second direction opposite to said first direction when: (1) the sense of the difference is a first sense and the shortest arc along said path between said desired position and said index position is not through said reference position or the sense of said difference is a second sense opposite to said first sense and said shortest arc is through said reference position; and (2) the sense of said difference in said second sense and said shortest arc is not through said reference position and/or the sense of said difference is said first sense and said shortest arc is through said reference position.

10. A system for moving a rotatable object having a plurality of discrete positions numbered consecutively from a reference point around a path of rotation thereof so as to locate any of said positions at an index point in said path, which system comprises means for translating the position of the object into a binary number corresponding to the address of the one of said positions at said index point, input means for providing a binary number corresponding to the address of any one of said discrete positions which is desired at said index point, means for comparing corresponding lower order digits of both said binary numbers to derive a first output which depends upon the sense of the difference therebetween and for deriving from the highest order digits of said binary numbers a second output which is the same as said first output when said higher order digits are the same and different from said first output when said highest order digits are different, and means for controlling the direction of rotation of the object depending upon said second output.

11. A system for moving a rotatable object having a plurality of discrete positions numbered consecutively from a reference position around a path of rotation thereof so as to locate any of said positions at an index point in said path, which system comprises means for translating the position of the object into a binary number corresponding to the address of the one of said positions at said index point, input means for providing a binary number corresponding to the address of any one of said discrete positions which is desired at said index point, means for comparing corresponding digits of both said binary numbers to derive from said digits, except for the highest order digits thereof, first and second outputs corresponding respectively to the one sense and the opposite sense of the difference between these digits so compared, said comparing means also being operative to derive from the comparison of said highest order digits a third output corresponding to said first output when the higher order digits are the same as each other and corresponding to said second output when said higher order digits are different from each other, and means for controlling the direction of rotation of the object depending upon said third output.

12. In a memory having a rotatable array including a plurality of different records at a plurality of discrete positions numbered consecutively from a reference position and representing addresses of the records, a system for locating any one of the records at an index point along the path of rotation of said array which comprises position coder means for translating the address of the one of the plurality of records at said index point into a multi-digti binary number, input means for providing a multi-digit binary number corresponding to the address of a selected one of the records which is desired at said index point, a comparison circuit operatively coupled to said position coder means and to said input means for comparing corresponding digits of the binary numbers representing the address at said index and the address at said input means, said comparison circuit providing alternative ones of a pair of outputs each separately corresponding to a different sense of the difference of the addresses compared in said circuit except for the highest order digits of said binary number, said comparison circuit having a third output which is alternatively connected to one of said pair of outputs when said highest order digits are the same and to the other of said pair of outputs when said highest order digits are different, a reversible motor for rotating the array, and means coupled to said third output for controlling the direction of rotation of said motor in response thereto.

13. In a memory having a rotatable basket for containing a plurality of different records, respectively, at a plurality of discrete positions numbered consecutively from a reference position around said basket, a system for locating any one of the records at an index station along the path of rotation of said basket which comprises a position coder including a plurality of switches for translating the address of the one of the plurality of records at said index station into a first multi-digit binary number, input means for providing a second multi-digit binary number corresponding to the address of a selected one of the records which is desired at said index station, a plurality of switches operatively coupled to said input means for individually registering the digits of said second multi-digit binary number, a comparison circuit including said position coder switches and said plurality of switches for comparing corresponding digits of said first number and said second number, said comparison circuit having a pair of output conductors connected between those of said switches which compare the highest order digits of said numbers and those others of said switches which compare the lower orders digits of said numbers, an output conductor connected to said highest order digits comparison switches said highest order digits comparison switches providing circuit paths between said pair of conductors which are completed alternatively when said highest order digits are the same and when said highest order digits are different, a motor for rotating the basket in one direction, and means coupled to said output conductors for reversing the direction of rotation of said motor.

14. A system for moving an object, positionable in a plurality of discrete positions, from an initial position to a desired position along a closed path, a plurality of numbers ordered consecutively with respect to a reference position along said path and each of said numbers corresponding to consecutive ones of the object positions, said system comprising means responsive to the position of the object for providing a number representing the position of the object, means for providing a first number representing the desired position of the object, means for modifying said first number to provide a second number representing another of said positions of the object which is a predetermined number of said positions closer to said initial position than said first number, means for
  (a) first comparing said second number with the number provided by the object position responsive means for providing a first output until the number provided by the object position responsive means exceeds said second number and
  (b) then comparing said first number with the number provided by the object position responsive means to provide a second output,
and means responsive to said first and second outputs for moving the object toward said desired position at a relatively high speed in response to said second output and a relatively low speed in response to said first output.

15. A system for moving an object having a plurality of discrete positions spaced successively from a reference position so as to locate any selected one of said positions at an index point, said system comprising means for driving the object selectively at high speed and at low speed, means for comparing a quantity representing the position of said index point successively with
  (1) a first quantity representing another of said plurality of discrete positions which is closer to said index point than said selected position and
  (2) a second quantity representing said seelcted position of the object, while the object is moved by said driving means,
and means responsive to said comparing means for changing the quantities being compared from said first quantity to said second quantity and the speed of said driving means from high speed to low speed after said first quantity equals the quantity representing the position of the object at said index point.

16. A system for controlling the movement of an object having a plurality of discrete positions numbered consequentially from a reference position around a closed path so as to position any selected one of said discrete positions at an index point along said path, said system comprising means for translating the position of the object into a first number representing the number of the one of said plurality of discrete positions located at said index point, input means for providing a second number representing said selected position of the object, means for sequentially comparing
  (1) said first number with said second number for deriving a first output depending upon the sense of the difference therebetween and
  (2) said first number with a third number representing another of said discrete positions spaced from said selected position a predetermined number of positions toward said index point for deriving a second output depending upon the sense of the difference therebetween,
means responsive to said first output, alternatively, adding a fourth number to and subtracting said fourth number corresponding to a predetermined plurality of said positions from said second number to provide said third number, and means responsive to said comparing means for driving the obejct at relatively high speed under control of the said second output and at relatively low speed under control of said first output.

17. A system for controlling the movement of an object having a plurality of discreet positions numbered consecutively from a reference position around a closed path so as to locate any selected one of said discrete positions at an index point along said path, said system comprising means for sequentially comparing (1) the number of the discrete position of the object initially at said index point and the number of said selected position of the object to derive the sense of the difference therebetween and (2) said number representing said position of the object initially at said index point and the number of another of said discrete positions spaced from said selected position toward said index point a predetermined number of positions from deriving another output representing the sense of the difference therebetween, means responsive to both said outputs for controlling the speed of movement of the object so that the object moves at relatively high speed when said outputs are the same and at relatively low speed when said outputs are different.

18. A system for positioning an object having a plurality of discrete positions thereon numbered consecutively from a reference position around a closed path to bring a selected position to an index point adjacent said path, said system comprising sequentially operative comparing means for first comparing the number of said selected position with the number of that one of said positions which is initially at said index point for deriving an output representing the sense of the difference therebetween, means responsive to said sense of said difference for modifying the number of representing said selected position to provide a modified number representing another of said positions spaced from said selected position toward said reference position a predetermined number of positions, said comparing means then comparing said modified number, and the number of said position which is initially at said index point for deriving an output representing the sense of the difference therebetween, means for storing said first named output, means responsive to said stored first named output for comparing said stored first named output and said second named output for deriving a third output when said first and second named outputs represent senses of differences which agree, means responsive to the presence or absence of said third output for moving the object at high speed and at low speed, respectively, means responsive to the presence of said third output for applying said modified number to said comparing means for comparison with the numbers representing positions of the object which pass said index point in succession and responsive to the absence of said third output for applying the number representing said selected position to said comparing means, and means responsive to said comparing means for stopping the object when said selected position representing number and the number of the position at said index are equal to each other.

19. A system for controlling the movement of an object having a plurality of discrete positions numbered consecutively around a closed path from a reference position so as to locate any selected one of said discrete positions at an index point adjacent said path, said system comprising means for translating the position of the object into a number representing the number of that one of said discrete positions which is at said index point, input means for providing a first number representing the number of said selected position, first comparing means responsive to said translating means and to said input means for sequentially comparing numbers applied thereto from said input means and said translating means to sequentially provide first, second and third outputs representing the sense of the difference therebetween, means controlled by said comparing means and responsive to the first of said sequential outputs representing the sense of the difference between a second number representing that position of the object initially at said index point and said first number for modifying said first number so that said modified number represents another of said discrete positions spaced from said selected position toward said index point by a predetermined plurality of positions, means for storing said first output, second comparing means for comparing said stored first output and the second output from said first comparing means representing the sense of the difference between said second number and said modified number for deriving the third output when said first and second outputs agree with each other, means controlled by said third output for selectively moving the object at relatively high speed in the presence of said third output and at relatively low speed in the absence of said third output, means responsive to the absence of said third output for changing said modified number to said second number, and means responsive to said first comparing means for stopping the object when said number provided by said translating means and said second number agree with each other.

References Cited in the file of this patent

UNITED STATES PATENTS

| | | |
|---|---|---|
| 1,905,229 | James | Apr. 25, 1933 |
| 2,690,913 | Robinson | Oct. 5, 1954 |
| 2,745,493 | Furman | May 15, 1956 |
| 2,778,504 | Byrne | Jan. 22, 1957 |
| 2,804,307 | Rockola | Aug. 24, 1957 |
| 3,002,602 | Giepen | Oct. 3, 1961 |